United States Patent Office 3,535,928
Patented Oct. 27, 1970

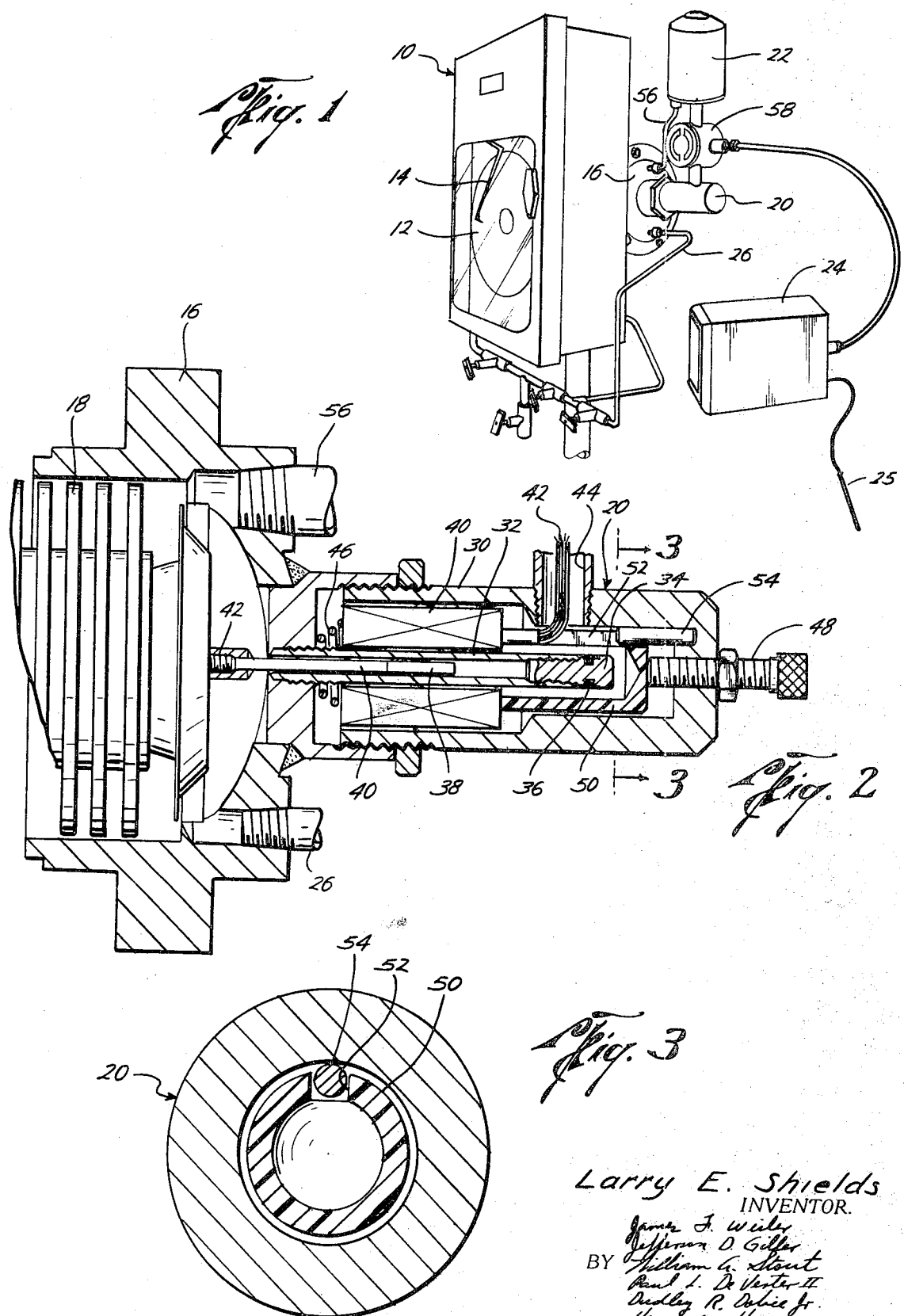

3,535,928
ELECTRICAL ATTACHMENT TO A
RECORDING FLOWMETER
Larry E. Shields, Harvey, La., assignor to Camco, Incorporated, Houston, Tex., a corporation of Texas
Filed Oct. 20, 1967, Ser. No. 676,876
Int. Cl. G01f 1/00
U.S. Cl. 73—205     3 Claims

ABSTRACT OF THE DISCLOSURE

An electrical attachment for a conventional mechanical recording flowmeter apparatus which measures fluid flow through an orifice including an electrical transducer connected to the mechanical differential pressure measuring element of the recorder which provides an electrical signal proportional to the differential pressure measured by the mechanical element without interfering with the mechanical element. An electrical computer connected to the output of the differential pressure transducer for receiving the electrical signal and computing the fluid flow. A transducer having an armature connected to the mechanical differential pressure measuring element of a mechanical recording flowmeter, sealing means enclosing the armature, a transformer coil surrounding the armature exteriorly of the sealing means, spring means urging the transformer in one longitudinal direction and an adjustment means for moving the transformer in a second longitudinal direction against the action of the spring for zeroing the transformer, and a bushing having an opening for passage of electrical connections from the transformer and means allowing longitudinal movement of the bushing but preventing rotational movement of the bushing.

BACKGROUND OF THE INVENTION

The present invention relates to the field of measurement of fluid flow through an orifice in which the fluid flow is determined by the differential pressure across the orifice, the line pressure, and the temperature of the flowing fluid. These factors are related by the equation $$F = C\sqrt{\frac{DP}{T}}$$

where

F=rate of flow,
P=static pressure,
D=differential pressure across the orifice,
T=temperature of the fluid, and
C=a constant.

It is conventional to utilize a recording chart having one, two or three recording pens corresponding to the variables differential pressure, static pressure and temperature being measured whereby the chart provides a permanent record for the measurement of fluid flow. However, the data on the recorded chart must be converted to the desired unit of fluid flow. It is also conventional, as shown by Pat. No. 3,097,527 to measure and compute fluid flow electrically through the use of a computer. However, the computerized flowmeter does not provide a permanent record nor a check on its own accuracy.

SUMMARY

The present invention is directed to an attachment to a conventional chart recorder which provides a means of gathering data on the fluid flow without interfering with the accuracy or performance of the recorder so as to provide data information which can be used to compute the fluid flow, displayed, or remotely recorded. It is also a genearl object to provide a low cost attachment to a conventional mechanical recorder which provides a direct computer readout of the fluid flow without interfering with the accuracy or performance of the mechanical recorder to thus provide both a direct fluid flow readout and a permanent record of the flow variables over a period of time.

It is also a general object of the present invention to provide an attachment to a conventional mechanical recording flow recorder having a mechanical differential pressure measuring apparatus by connecting an electrical transducer to the mechanical measuring element of the recorder without sacrificing or interfering with the performance of the mechanical measuring element to provide an electrical signal proportional to the differential pressure.

It is still the further object of the invention to provide in combination with a mechanical chart recording flowmeter measuring apparatus having a mechanical pressure measuring means, an electrical differential pressure measuring transducer connected to the mechanical pressure measuring means for providing an electrical signal proportional to the differential pressure and providing a static pressure transducer conected in communication with one side of the mechanical pressure measuring means for measuring the static pressure of the fluid and an electrical computer connected to the output of the differential pressuer transducer and the output of the static pressure transducer for receiving the electrical signals and computing the fluid flow.

A still further object of the present invention is the provision of a transducer for attachment to a mechanical recording flowmeter measuring apparatus having a mechanical differential pressure measuring element which includes an armature connected to the mechanical differential pressure measuring element, sealing means enclosing the armature and the pressure to which it is exposed, and a transformer coil surrounding the armature exteriorly of the sealed means.

A still further object of the present invention is the provision of an improved transducer for connection to a mechanical recording flowmeter in which the transducer includes a housing, an armature extending into the housing and connected to the mechanical differential pressure measuring means, sealing means enclosing the armature for sealing the armature to the differential pressure measuring means, a transducer surrounding the armature exteriorly of the sealing means for measuring the position of the armature and thus providing an electrical signal proportional to the differential pressure measured by the mechanical measuring means, a spring in the housing yieldably urging the transformer in one longitudinal direction and an adjustment means in the housing for moving the transformer in a second longitudinal direction against the action of the spring for zeroing the transducer and which adjustment means may include a bushing having an opening aligned with an opening in the housing for the passage of electrical connections and means allowing longitudinal movement of the bushing but preventing rotational movement of the bushing relative to the housing.

BRIEF DESCRIPTION OF THE DRAWING

In the attached drawing, like character references refer to like parts throughout the several views in which FIG. 1 is a perspective view of the present invention attached to a conventional mechanical flowmeter recorder, FIG. 2 is an enlarged fragmentary view in cross section showing the connection of the transducer of the present invention to a conventional mechanical pressure measuring device, and FIG. 3 is a cross sectional view taken along the line 3—3 of FIG. 2.

Referring now to the drawing, particularly FIG. 1, the reference numeral 10 generally indicates a mechanical recording flowmeter for measuring fluid flow through an orifice such as a conventional Barton flowmeter which has a recording chart 12 and one or more recording pens 14 for recording the differential pressure across the orifice, the static line pressure, and, if desired, the temperature of the fluid being measured depending upon the installation. The meter 10 also includes a mechanical pressure measuring means such as a diaphragm or a bellows in a body 16 which is connected by suitable lines to the pressure connections involved and which in turn actuates the pen recorders 14 to provide a permanent record on the chart 12. Such a recorder is conventional and no further description is believed to be necessary.

The present invention is directed to providing an electrical attachment to the mechanical recording meter 10 which will utilize the measuring element or pressure measuring means of the meter 10 without interfering with or sacrificing the performance of the instrument 10 and provide an instantaneous electrical information signal which can be displayed, remotely recorded, used for control functions or for computing fluid flow and yet preserve the record 12 which can be used if desired as a check on the electrical readout. Thus, an electrical transducer 20 is provided and connected directly to the body 16 for connection to the mechanical element therein which measures the differential pressure, a static transducer 22 which is also connected to the meter 10 for measuring the static line pressure if desired, and an electrical flowmeter computer 24 which is connected to and receives the output of the transducers 20 and 22 for solving the flow equation and computing the fluid flow. If desired, a temperature probe 25 connected to the computer 24 could be inserted into the fluid line (not shown) as is conventional to obtain a temperature measurement.

Referring now to FIG. 2, a body 16 of the pressure measuring element of the meter 10 is shown having a low pressure measuring bellows which is connected to a second high pressure measuring bellows (not shown) in the body 16 with the low pressure bellows 18 being exposed to the low pressure side of the orifice through a line 26 while the high pressure bellows is similarly connected at the other end to a high pressure line all of which is conventional. Thus, the transducer 20 includes a housing 30 having a tubular member 32 extending therein closed by an end 34 which includes a seal 36 to form a sealed compartment in communication with the interior of the body 16 of the meter 10. An armature 38 is enclosed in said tube 32 and connected by a stem 40 to a threaded shaft 42 on the bellows 18 thereby causing the armature 38 to move as the threaded shaft 42 moves in response to the differential pressure measured by the bellows 18 in the body 16. Thus, the position of the armature 38 is a measure of the differential pressure measured by the bellows, but does not impair the performance of the bellows or mechanical pressure sensing means of the meter 10 of the armature and its connections are not required to operate through a pressure seal. A transformer coil 40 is provided surrounding the armature 38 and includes a plurality of electrical connections 42 extending out of the housing 30 through an opening 44 to provide an indication of the position of the armature 38 and thus a measurement of differential pressure.

A spring 46 may be provided in the housing 30 at one end of the transformer coil 40 to yieldably urge the transformer coil in one longitudinal direction and a threaded adjustment screw 48 may act against the transformer coil and against the action of a spring in a second longitudinal direction through a bushing 50 for moving the position of the transformer coil 40 relative to the armature 38 for zeroing the transducer. Preferably the bushing 50 includes a longitudinal slot 52 for the passage of the electrical connections 42 therethrough and through the housing opening 44 and includes a pin 54 connected to the housing 30 and in the slot 52 thereby allowing longitudinal movement of the bushing for zero adjustment of the transducer, but prevents rotational movement of the bushing 50 relative to the housing 30 to prevent any binding with the electrical connections 42.

The static transducer 22, which is a conventional transducer such as a diaphragm type, is connected by a line 56 to the body 16 and thus in communication with the pressure measurement from line 26 to provide a measurement of line pressure thus again providing an electrical readout of one of the variables without affecting the performance of the meter 10. A conventional flow computer, such as the model 464–A as manufactured by Camco, Incorporated may be electrically connected through a junction box 58 to the transducers 20 and 22 to receive the output signals from the transducers and electrically compute the fluid flow. Or if desired, the output from the transducers 20 and 22 may be remotely transmitted, displayed or used for control functions.

The present invention, therefore, is well adapted to carry out the objects and attain the ends and advantages mentioned as well as others apparent therein. While a presently preferred embodiment is given for the purpose of disclosure, numerous changes in the details of construction and arrangement of parts may be made which will readily present themselves to those skilled in the art and which are encompassed wtihin the spirit of the invention and the scope of the appended claims.

What I claim is:

1. In combination with a mechanical recording flowmeter measuring apparatus for measuring fluid flow through an orifice and having a mechanical differential pressure measuring means subjected to differential pressure across the orifice and actuating a pen recorder for recording the flow variables of fluid flow, an electrical fluid flow measuring apparatus comprising,
   a transducer including,
      a housing,
      an armature connected to the mechanical differential pressuring measuring means and extending into the housing,
      sealing means enclosing the armature,
      a transformer surrounding the armature exteriorly of said seal means,
   a static pressure transducer connected in communication with one side of the mechanical pressure measuring means for measuring the static pressure of the fluid, and
   an electrical computer connected to the output of the differential pressure transducer and the output of the static pressure transducer for receiving said electrical signals and computing the fluid flow.

2. The apparatus of claim 1 including,
   spring means in the housing yieldably urging the transformer in one longitudinal direction, and
   adjustment means extending through the housing for moving the transformer in the second longitudinal direction against the action of the spring for zeroing the transducer.

3. The apparatus of claim 2 wherein the housing includes an opening for the passage of electrical connections to the transformer and wherein the adjustment means includes a bushing having an opening aligned with the housing opening and means allowing longitudinal movement of the bushing, but preventing rotational movement of the bushing relative to the housing.

References Cited

UNITED STATES PATENTS

| 2,340,880 | 2/1944 | Keinath | 73—205 XR |
| 2,414,318 | 1/1947 | Middel | 73—205 |
| 2,629,826 | 2/1953 | McIlvaine et al. | 73—313 |
| 3,097,527 | 7/1963 | Davis et al. | 73—205 |

RICHARD C. QUEISSER, Primary Examiner

J. L. LUNSFORD, Assistant Examiner

U.S. Cl. X.R.

73—213